July 7, 1964 G. N. ANAGNOSTOU 3,140,112
ROPE NET AND FITTINGS THEREFOR
Filed March 28, 1963 2 Sheets-Sheet 1

INVENTOR.
GEORGE N. ANAGNOSTOU
BY
Mellin and Hanscom
ATTORNEYS

July 7, 1964   G. N. ANAGNOSTOU   3,140,112
ROPE NET AND FITTINGS THEREFOR
Filed March 28, 1963   2 Sheets-Sheet 2
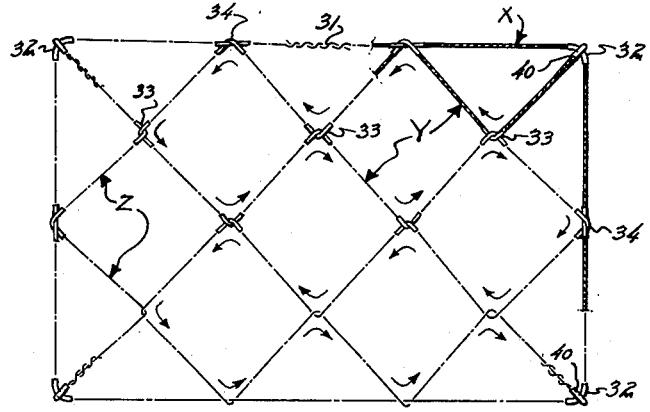
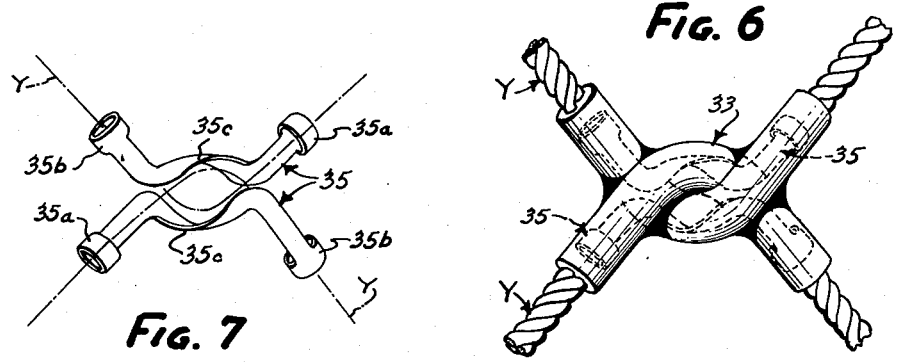
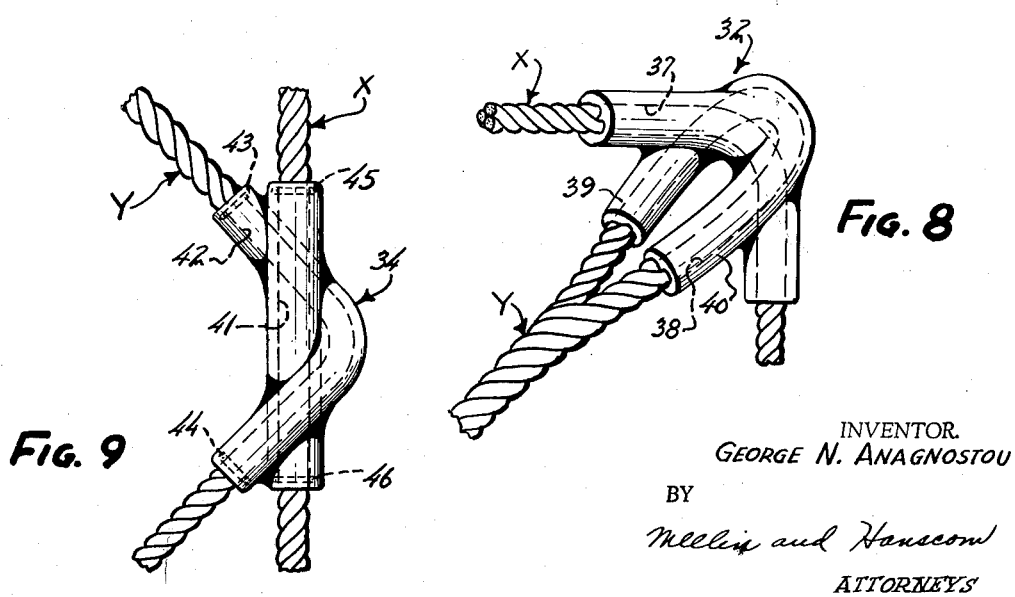
INVENTOR.
GEORGE N. ANAGNOSTOU
BY
Mellin and Hanscom
ATTORNEYS

United States Patent Office 3,140,112
Patented July 7, 1964

3,140,112
ROPE NET AND FITTINGS THEREFOR
George N. Anagnostou, 203 Missouri St.,
San Francisco, Calif.
Filed Mar. 28, 1963, Ser. No. 268,754
12 Claims. (Cl. 294—77)

This invention relates to rope nets and more particularly to heavy duty cargo nets, fishing nets and netting of other general use which comprise lengths of intersecting braided ropes. The invention more especially involves rope fittings for connecting together intersecting lengths of rope.

Although many types of nets have been previously devised, it is believed that the present invention involves the use of new types of fittings for producing nets of unique construction. The fittings which are contemplated essentially comprise a rope housing formed of elastic material that will prevent chafing to the ropes at junction points where the ropes intersect at various angles to each other. The elastic nature of the rope housings not only protects the ropes against chafing but is an essential feature to the rapid assembly of the netting, requiring a minimum of splicing and retaining maximum strength in the rope by permitting long and continuous strands of roping to be used.

An important feature of the invention involves a fitting construction for joining together intersecting ropes which form the mesh portion of the net. These fittings comprise a pair of resilient metallic straps which allow flexure of the ropes while also forming a positive interlock between intersecting ropes. It will be evident in view of the following description that the metallic straps serve to bind intersecting ropes together while preventing undue stretching and consequent tearing of an elastic housing.

One principal object of this invention is to provide novel rope connectors for effectively and securely attaching junction points of ropes in fixed position to each other.

Another object is to provide a rope connector and fitting which will absorb sudden shocks resulting from heavy loads being dropped into the net.

Another object of the invention is to provide rope connectors for netting which provide proper spacing and ideal stationary support to maintain the ropes in straight lengths so that their full tensile strength may be utilized.

Another object of the invention is to provide rope nets which utilize a minimum number of rope pieces, thereby eliminating much splicing.

It is another object of the invention to provide rope fittings for intersecting ropes which extend transversely to one another at approximately 90°.

A further object of the invention is to provide rope fittings which are bonded to the ropes which are received therethrough by means of liquid latex material. It is contemplated that such liquid material may be best inserted through the fitting by using a hollow needle and at a time after the fittings have been properly positioned along the ropes.

A still further object of the invention is to provide a rope net and fittings therefor formed from a continuous length of roping and providing a diamond-shaped netting.

Another object is to provide a rope netting and fittings therefor essentially comprising two intersecting pieces of rope, one arranged with parallel lengths extending in one direction and the other having parallel lengths extending transversely to the lengths of the first rope.

A further object of the invention is to provide elastic rope fittings for forming nets and involving the use of a hollow needle to inject liquid latex into the rope passages of the housing to resiliently bind and hold the housing in fixed position upon the rope.

Other objects of this invention will become apparent in view of the drawings and the following description.

In the drawings forming a part of this application and in which like parts are identified by like reference numerals throughout the same, FIG. 1 is a plan view of one embodiment for a rope net incorporating features of this invention;

FIG. 5 is a second embodiment of rope netting showing another feature of the invention including rope connections used therewith;

FIG. 6 is an enlarged detail view of the rope fitting used with the netting of FIG. 5 to join intersecting ropes;

FIG. 7 is a detail view of a pair of straps which are embedded in and form a part of the fitting shown in FIG. 6;

FIG. 8 is a perspective view of a corner rope fitting used with the netting shown in FIG. 5; and FIG. 9 is an enlarged detail of a rope fitting used with a net of FIG. 5 to join an intersecting mesh rope with a bolt rope.

Figure 1:
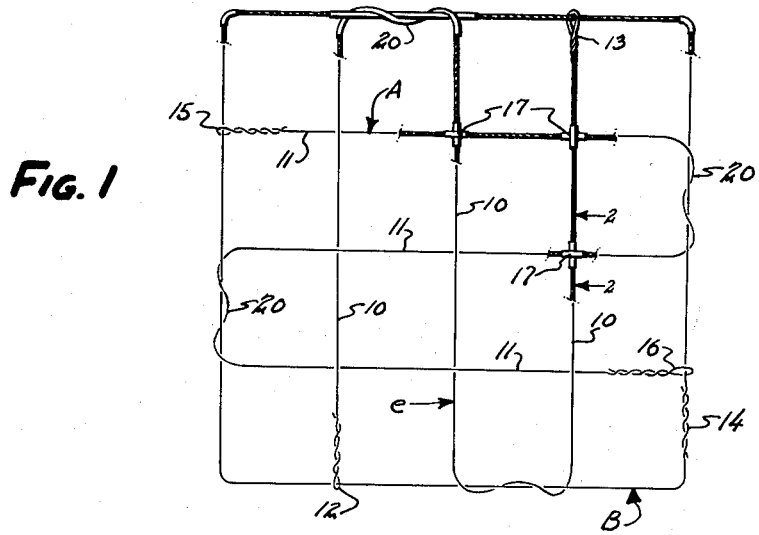
Figure 2:
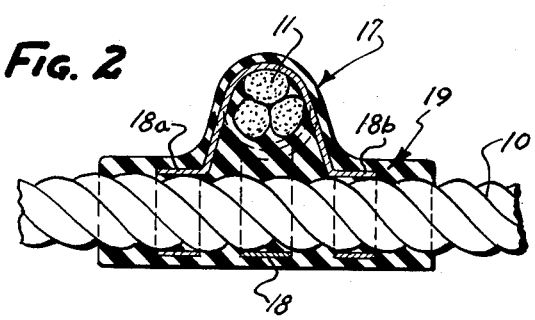
FIG. 2 is an enlarged section of a rope housing used in connection with the netting shown in FIG. 1 and taken on line 2—2 thereof.
Figure 3:
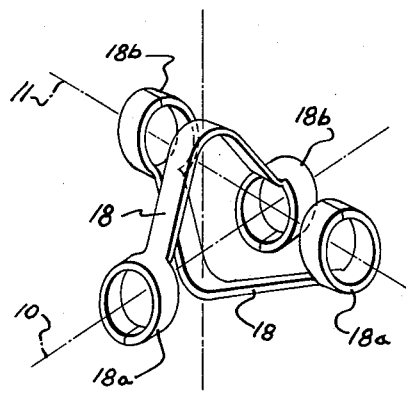
FIG. 3 is a perspective view of a pair of straps which form a part of the fitting shown in FIG. 2.

Referring to FIG. 1 in particular, there is shown a rope net comprising parallel lengths of rope 10 and transverse lengths of rope 11. Each parallel length 10 is formed from a single piece of rope A which is joined by splicing its ends 12 and 13 with a continuous bolt rope B, the ends of said bolt rope being spliced together at point 14. Similarly, transverse lengths 11 are formed from a single piece of rope C housing its ends 15 and 16 spliced to bolt rope B. Intersecting portions of parallel lengths 10 and transverse lengths 11 are held together by rope fittings 17, best shown in FIGS. 2 and 3, said fittings comprising a pair of mated strap connectors 18 embedded in a body 19 of elastic material, such as latex. The strap connectors are formed of spring steel and each strap includes a pair of eyes or collars 18a and 18b integrally formed at its ends.

It is to be noted that each parallel length 10 extends through both eyes of one strap while an intersecting transverse length 11 extends through both eyes of the other strap. Also each strap 18 forms an eye or opening with the length of rope which extends through its pair of eyes 18a and 18b, and the other length of rope is received through this eye or opening to form an interlock. Accordingly, each intersecting portion of lengths 10 and 11 are bound together in a positive manner by a pair of straps 18; and the elastic body 19 of rope fittings 17 cannot, therefore, be abused or torn by any load as may be applied to the ropes. The elastic body 19 permits strap connectors 18 to be flexed, thereby cushioning any shock upon the ropes as they are made taut or twisted by sudden loading as when a weight is dropped into the net.

Figure 4:
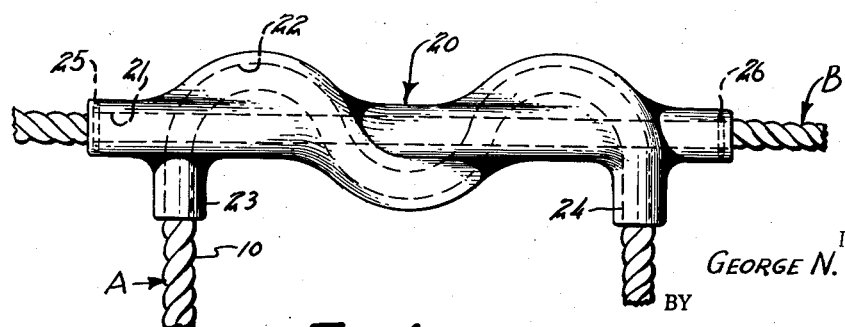
FIG. 4 is a rope housing used in connection with the rope net of FIG. 1 for joining those ropes which form the mesh portion of the net to a bolt rope that extends peripherally of the netting.

The ropes A and C which form parallel lengths 10 and transverse lengths 11, respectively, are each entwined around bolt rope B and joined thereto by bolt rope housings 20, shown in FIG. 4. Housings 20 are made of elastic material and are formed with a longitudinal passage 21, which receives the bolt rope therethrough. A spiral passage 22 is also formed within the housing, said passage extending around passage 21. Passage 22 receives either one of the ropes forming rope lengths 10 or 11, and the ends of the passage are directed normal to the axis of passage 21 by lead ends 23 and 24. The distance intermediate lead ends 23 and 24 determines the spacing between adjacent parallel ropes 10 or adjacent transverse ropes 11, as the case may be. Various lengths or sizes of housings may be used to form nets of different mesh sizes.

A pair of garter springs 25 and 26 are disposed within housing 20 near the ends of bolt rope passage 21. The garter springs serve to clamp the housing upon the bolt rope and prevent longitudinal relative movement. In addition, it is contemplated that liquid rubber or latex may be injected through housing 20 as by means of a hollow needle so as to fill the void spaces between the passage 21 and the braiding of the bolt rope. Thus, when the latex takes a permanent but resilient set the rope will be locked to housing 20 as though it had been originally molded therein. It is to be understood, of course, that the same process might be followed with respect to securing parallel or transverse lengths of rope in the passages 22.

Referring to FIGS. 5–9 of the drawings, there is illustrated another embodiment of the invention as applied to the construction of a diamond mesh netting. This net comprises a continuous bolt rope X the ends of which are spliced together at a point 31. The main portion of the net is formed from a continuous length of roping Y secured to bolt rope X at the upper right-hand corner of the net as shown in FIG. 5 by a corner fitting 32, best shown in FIG. 8. The roping is then woven in zigzag fashion toward the left between three rope fittings 33 and two bolt rope housings 34, details of which are shown in FIGS. 6 and 9, respectively. The last rope fitting 33 on the left is oriented so that the roping is returned and woven in zigzag fashion back toward the right, in the manner shown by direction arrows. This zigzag weaving procedure is continued until the other end of roping Y is fastened around rope X at the bottom right corner of the netting, passing through another corner fitting 32 and being spliced to itself.

It will be noted that a third length of roping Z is utilized for attaching the left side of roping Y to the left side of bolt rope X. Roping Z is connected to the bolt rope by corner fittings 32 and a bolt rope housing 34, and the roping is woven in zigzag fashion between rope fittings 33.

Rope fittings 33 are formed in a manner substantially the same as the previously described fitting 17, each fitting 33 comprising a pair of resilient metal straps 35 embedded in a body 36 of latex material. Straps 35 include a pair of eyes or collars 35a and 35b integrally formed at or near the ends of a curved center portion 35c, as shown in FIG. 7.

Referring to FIG. 6, both eyes of each strap receive the same length of rope therethrough; and the center portion 35c, together with the rope that extends through the eyes 35a and 35b, form an eye that receives the intersecting rope. Thus, the straps 35 form an interlocking connection of each pair of intersecting ropes so that the body 36 cannot be torn apart by forces tending to separate an intersecting pair of ropes. However, the body 36 and straps 35 cooperate to cushion any shock imparted to the ropes themselves.

FIG. 8 illustrates the corner rope fitting 32 the body of which is preferably formed of latex material and having a curved rope passage 37 for receiving bolt rope X. A second passage 38 extends about passage 37 in a plane normal thereto, said passage 38 terminating through rope leads 39 and 40. The ropes which pass through passage 38 are shown as being spliced near the ends of rope leads 39 and 40. Relative movement between the ropes and the fitting normally presents no problem. However, garter springs may be used near the ends of passages 37 and 38 if desired, or liquid latex material may be injected into the fitting as previously described in connection with other fitting connections.

Bolt housing 34, shown in FIG. 9, differs from rope fitting 32 merely in the direction of the rope leads. However, the fact that housing 34 is provided with a relatively straight bolt rope passage 41 and a less tortuous passage 42 (compared with passages 37 and 38, respectively, of fitting 32), it is desirable that garter springs 43–46 be used to prevent movement of the ropes through the housings. Alternately, of course, liquid latex may be injected through the housing to intimately secure the ropes thereto.

It is to be understood that although preferred embodimens of this invention have been shown and described, various changes may be made without departing from the spirit of the invention or the scope of the attached claims, and each of such changes is contemplated.

What I claim and desire to secure by Letters Patent is:

1. A rope connection for nets or the like having a pair of intersecting ropes, comprising: a pair of strap connectors, each strap connector having eyes at both of its ends, one rope extending through both eyes of one strap, and the other rope extending through both eyes of the other strap, each strap forming an eye with the rope which extends through the eyes thereof and receiving the other rope therethrough; and a flexible housing for enclosing both straps and the crossed ropes.

2. A rope net comprising: parallel and transverse lengths of ropes, each parallel length of rope intersecting said transverse lengths of rope and being joined respectively thereto by a rope fitting comprising a pair of strap connectors, each strap connector having eyes at both of two ends, the parallel length of rope extending through both eyes of one strap and a transverse length of rope extending through both eyes of the other strap of a pair, each strap of a pair forming an eye with the length of rope which extends through the eyes thereof and receiving the other length of rope therethrough.

3. The rope net of claim 2 wherein each parallel length of rope intersects each transverse length of rope at an angle of approximately 90°.

4. The rope net of claim 2 and further wherein each fitting includes an elastic housing, the pair of straps of said fitting being embedded therein.

5. The rope net of claim 2 and further including a bolt rope extending peripherally of said net; said parallel lengths of rope being formed from a first length of rope entwined with said bolt rope, said transverse lengths of rope being formed from a second length of rope entwined with said bolt rope; and a plurality of bolt rope housings for joining said first and second lengths of rope to said bolt rope at each area of entwining, each housing having a first passage for receiving said bolt rope therethrough and a spiral passage extending about the first passage, said continuous first and second lengths of rope passing through the spiral passage of respective bolt rope housings.

6. The rope net of claim 5 wherein each bolt rope housing is formed of elastic material, the ends of said first passage being circumscribed with a garter spring embedded in said elastic material.

7. The rope net of claim 5 wherein each bolt rope housing is formed of elastic material, said first passage being supplied with liquid latex material after said bolt rope has been drawn therethrough and the housing positioned therealong.

8. A rope net comprising: first and second zigzag lengths of rope, each rope intersecting the other at a bend therein, and a plurality of rope fittings for joining said first and second lengths of rope at their intersecting bends, each fitting comprising a pair of strap connectors, each strap connector having eyes at both of two ends, said first length of rope extending through both eyes of one strap of a pair, and said second length of rope extending through both eyes of the other strap of a pair, each strap of a pair forming an eye with the length of rope which extends through the eyes thereof and receiving the other length of rope therethrough.

9. The rope net of claim 8 and further wherein each fitting includes an elastic housing, the pair of straps of said fitting being embedded therein.

10. The rope net of claim 8 and further including a bolt rope extending peripherally of said net, said first and second zigzag lengths of rope being entwined with said bolt rope; and a plurality of bolt rope housings for joining said first and second lengths of rope to said bolt rope at each point of entwining, each housing having a first passage for receiving said bolt rope therethrough and a second passage extending about the first passage, said first and second lengths of rope passing through the second passage of respective bolt rope housings.

11. The rope net of claim 10 wherein each bolt rope housing is formed of elastic material, the ends of said first passage being circumscribed with a garter spring embedded in said elastic material.

12. The rope net of claim 10 wherein each bolt rope housing is formed of elastic material, said first passage being supplied with liquid latex material after said bolt rope has been drawn therethrough and the housing positioned therealong.

References Cited in the file of this patent

UNITED STATES PATENTS 2,817,263    Pedley _____ Dec. 24, 1957

FOREIGN PATENTS 1,033,803    France _____ of 1953